Figure 1:
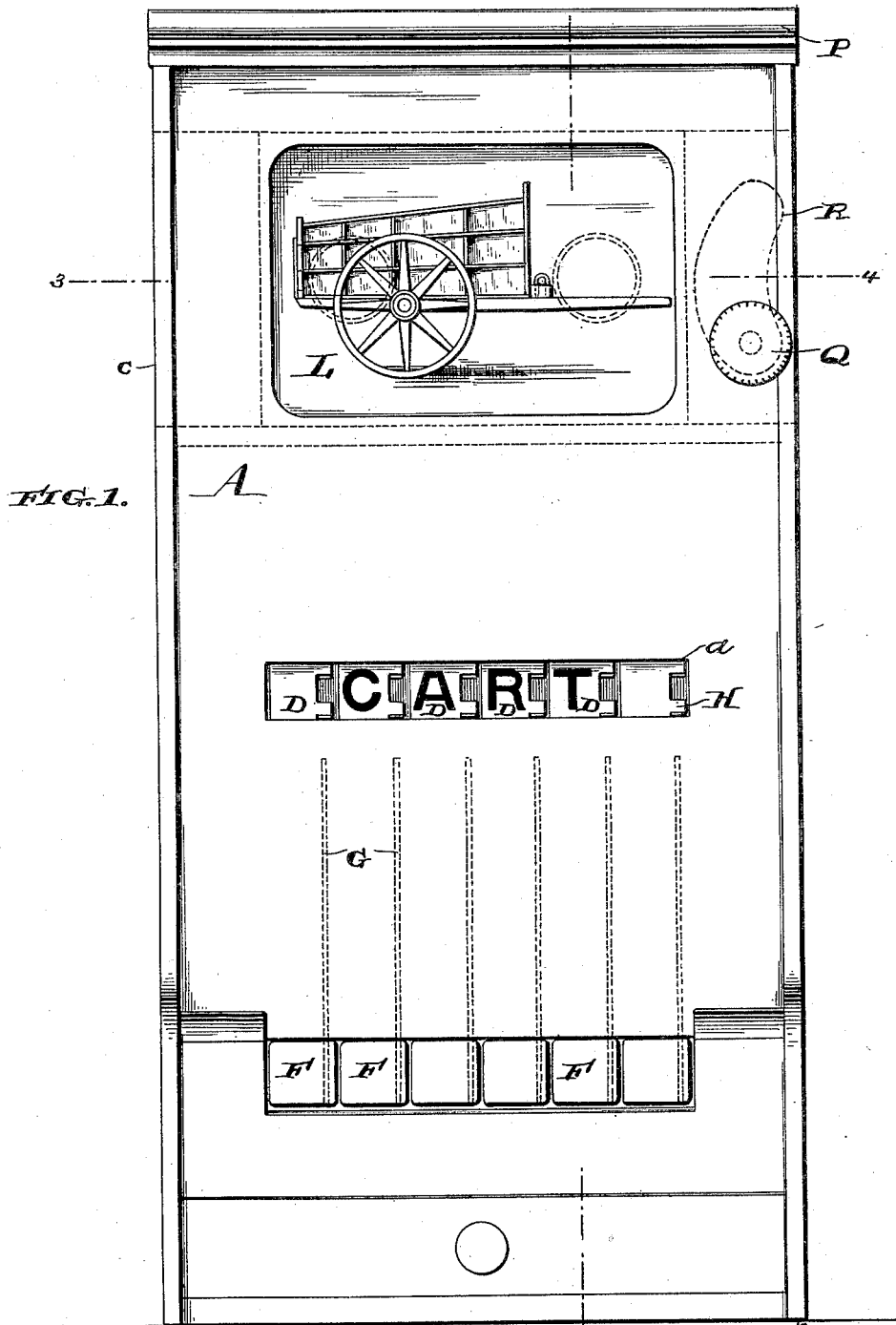

(No Model.) 2 Sheets—Sheet 1.

G. H. CLARKSON.
KINDERGARTEN APPARATUS.

No. 465,834. Patented Dec. 29, 1891.

Witnesses:
Henry Denny
S. T. Yerkes

Inventor:
Geo. H. Clarkson
by his atty.

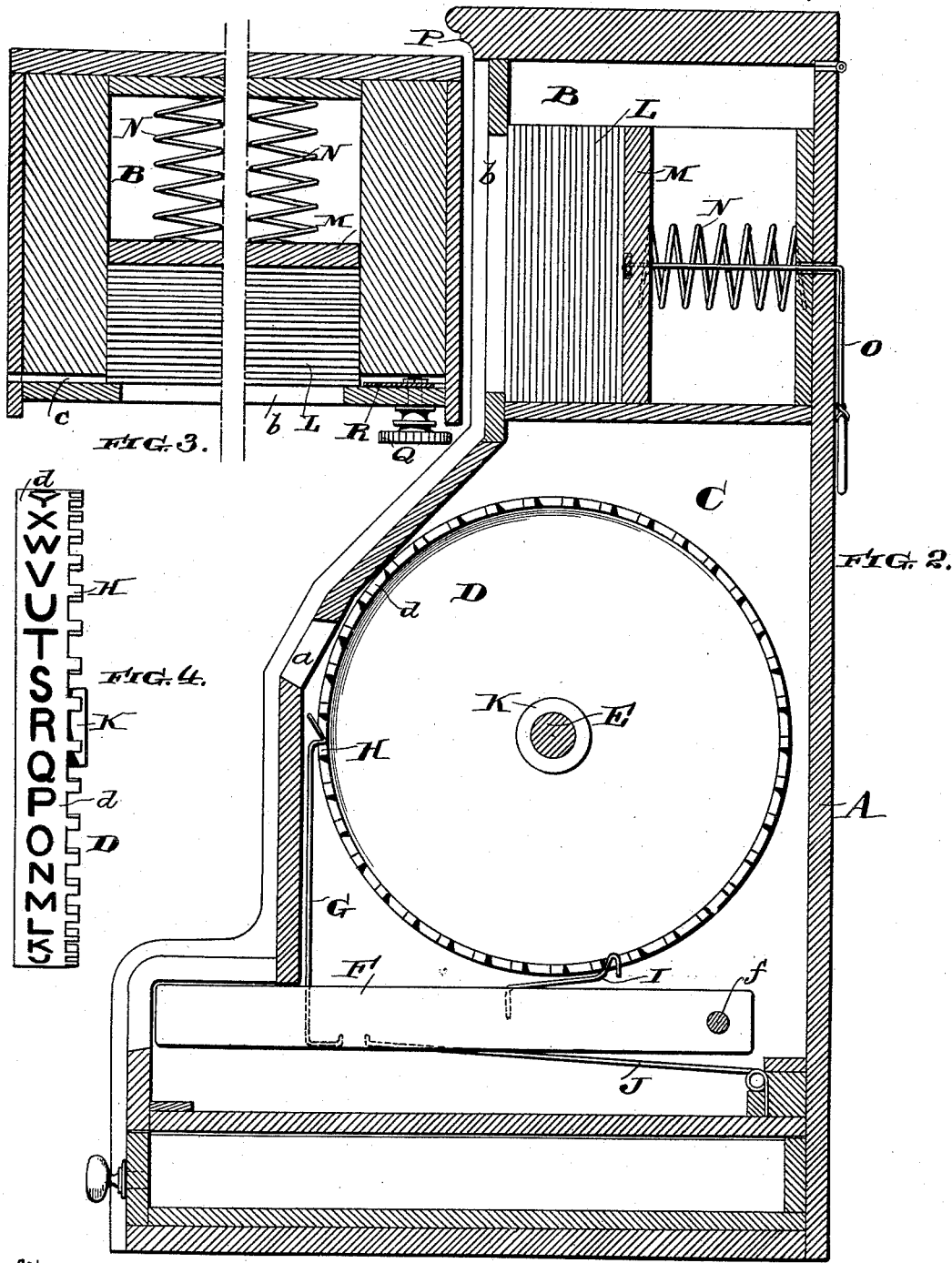

UNITED STATES PATENT OFFICE.

GEORGE H. CLARKSON, OF NEW YORK, N. Y.

KINDERGARTEN APPARATUS.

SPECIFICATION forming part of Letters Patent No. 465,834, dated December 29, 1891.

Application filed January 12, 1891. Serial No. 377,401. (No model.)

*To all whom it may concern:*

Be it known that I, GEORGE H. CLARKSON, of the city, county, and State of New York, have invented an Improvement in Kindergarten Apparatus, of which the following is a specification.

My invention relates to kindergarten apparatus; and it consists of certain improvements which are hereinafter fully set out in the specification which follows, and are shown in the accompanying drawings.

My invention relates to educational appliances in general, and more particularly to that class thereof adapted for use in kindergartens for the instruction of young children, and is designed to win the attention and interest of the child by imparting amusement to it. The appliance is thus an educational apparatus in the nature of a toy, which, while interesting and amusing the child, imparts instruction to it.

It is also the object of my invention to render the apparatus convenient to operate and comparatively inexpensive to manufacture, so that an efficient apparatus of this character may be obtained at small cost.

In carrying out my invention I employ a suitable box or frame, in which are arranged a suitable series of rotatable disks or wheels provided upon their peripheries with letters of the alphabet or other suitable characters, and by means of appropriate mechanism, such as is hereinafter described, these disks may be independently rotated to produce different combinations of the characters or letters upon their peripheries. By this means the child is enabled to spell out words or to make numerical combinations. In connection with these disks and the mechanism for operating them may be employed a series of object-cards adapted to be successively exposed to present a word or object to the child, which is to be produced or spelled upon the disks.

My invention also consists of certain improvements in construction and novel combinations of parts, which are hereinafter more fully described and claimed.

In the drawings, Figure 1 is a front elevation of my improved kindergarten apparatus. Fig. 2 is a sectional side elevation of the same on the line 1 2 of Fig. 1. Fig. 3 is a horizontal sectional view of the upper portion of the apparatus on the line 3 4 of Fig. 2; and Fig. 4 is a side elevation of one of the detached rotatable disks.

A is a suitable box or frame divided into the upper and lower compartments B and C. The front of the lower portion of the frame is provided with an opening or aperture $a$, to expose to view a portion of the peripheries of the disks.

D are a series of rotatable disks supported adjacent to each other upon a shaft E within the lower compartment C and free to rotate thereon. The peripheries $d$ of these disks D are provided with a series of letters or characters. In practice I prefer to arrange upon the periphery of each disk the letters of the alphabet and the ordinary numerical characters.

F are a series of levers for operating the disks D, pivoted, as at $f$, within the frame A, and having their free ends exposed so as to be operated from the outside of the box or frame. Carried by each lever F is an arm or rod G, adapted to engage with teeth or projections H upon the disks D. These teeth H correspond in number with the characters or letters upon the periphery of the disk, so that the movement of successive teeth or projections will move successive objects or letters behind the opening $a$. These teeth are preferably made integral with the disks D and extending laterally from their peripheries $d$, as shown. By constructing the teeth H in this manner the peripheries of the disks are formed without any projections upon their surfaces, and the front of the frame or box A may be brought closer to the surfaces of the disks.

I are springs carried by the levers F, engaging with the teeth H to prevent backward rotation of the disks and to arrest each disk after a single movement by the lever F and its rod or arm G.

J are springs to hold the lever F in a normally-raised position and to lift them after each depression in turning the disks D. In practice the levers F may be made of wood and the arms G and springs I and J of wire, thus rendering the construction inexpensive.

I prefer to construct each disk D with a collar K, which projects upon one side beyond the plane of the ends of the lateral teeth H. This collar is loosely fitted upon the shaft E and serves to hold the series of disks D in proper position relatively one to the other, rendering the use of intermediate washers unnecessary.

The upper compartment B is formed with an opening $b$ in the front to expose to view the topmost of a series of object-cards L. These cards L are pressed forward by a block M and a spring or springs N. By means of a cord connected with the block M the latter may be drawn back when desired to insert new cards in the compartment B. The top or cover P is preferably made hinged or removable to permit this replenishing of the cards.

Upon one side of the upper compartment B adjacent to the front is a slot or guidway $c$, and arranged upon the opposite side is a pusher, such as the pivoted cam-piece R, operated from the outside of the box by a handle Q to push the front card of the series out into the guideway or slot $c$ to bring its edge upon the outside of the box, and thus to permit it to be withdrawn and to expose a new card L.

While I prefer the mere details of construction which are here shown, it is apparent that they may be modified without departing from the principles of the invention.

From the foregoing description of the apparatus its operation is apparent. A card L is exposed in the opening $b$, and the child thereupon operates the successive levers F to turn the disks until the appropriate letters or objects upon their peripheries $d$ are exposed through the opening $a$. In this manner the name of the object shown upon the exposed card may be spelled, or spelling or objects upon the cards may be reproduced upon the disks.

Any number of disks may be employed. In the drawings I have shown six disks adapted to the spelling of words of six letters and to the forming of numerical combinations up to one million. Upon the periphery of each disk, in addition to the letters or characters thereon, I prefer to have a blank space, as shown, so that when any disk is not employed no character will be exposed thereon to confuse the child.

Having now described my invention, what I claim as new, and desire to secure by Letters Patent, is—

1. In a kindergarten apparatus, a closed case having a sight-aperture $a$, a series of rotatable wheels D, provided with lateral projections $d$ and having a series of letters upon their peripheries, a series of levers F, pivoted at their inner extremities at $f$ within the case, and having a series of vertical rods G, adapted to engage successive projections upon the disk, carried by the free end of said levers within the case, a spring J for each of said levers, having one end secured to the interior of said case and the other end bearing upon the under surface of the key to maintain each in a normally-raised position, and a spring I, carried by each of said levers between the pivot-point $f$ and the vertical rod G, and normally engaging one of the projections upon the disk to prevent rotation thereof, whereby upon the depression of any one of the keys against the action of the spring J the vertical rod G will be depressed, rotating the disk a portion of a revolution, and simultaneously therewith the spring I will be moved out of contact with the projection upon the disk to permit said disk to rotate.

2. In a kindergarten apparatus, a closed case having a sight-aperture $a$, a series of rotatable disks having a series of letters upon their peripheries and provided with projections, a series of wooden keys F, pivoted within said case at their inner extremities, as at $f$, rods G, carried by the free ends of said levers F and having their upper ends bent to engage the projection upon the corresponding disk, springs J, connected with said levers F and located under them, and springs I, carried by said keys between their pivot-points $f$ and the rods G, adapted to normally engage one of the projections of the corresponding disk to prevent rotation thereof, but moved from contact therewith when a lever is depressed, said rods G and springs I and J being formed of bent wire, having their extremities let into the wood of the keys F.

3. A kindergarten apparatus consisting of closed case A, having a central partition dividing it into two uncommunicating compartments B and C, provided with sight-apertures $b$ and $a$, respectively, a movable cover for the upper compartment B to permit of access thereto, a series of object-cards located in said upper compartment and supported by the partition, said upper compartment being formed with a laterally-extending passage-way $c$, extending to the outside of the case and located entirely above said partition, a cam-piece pivoted in a recess adjacent to the opposite side of the opening $c$ within the compartment B, adapted to successively push the foremost of the series of object-cards laterally out through the passage-way $c$, and a series of rotatable disks in the lower compartment having their peripheries provided with a series of letters.

In testimony of which invention I have hereunto set my hand.

GEORGE H. CLARKSON.

Witnesses:
 EWD. L. HALL,
 W. L. BENNEM.